US012031053B2

(12) United States Patent
Budurlean

(10) Patent No.: US 12,031,053 B2
(45) Date of Patent: Jul. 9, 2024

(54) LOW GLOSS POLYURETHANE COATING COMPOSITIONS

(71) Applicant: Akzo Nobel Coatings International B.V., Amsterdam (NL)

(72) Inventor: Gabriela Budurlean, Nashville, TN (US)

(73) Assignee: Akzo Nobel Coatings International B.V. (NL)

( * ) Notice: Subject to any disclaimer, the term of this patent is extended or adjusted under 35 U.S.C. 154(b) by 251 days.

(21) Appl. No.: 17/769,423

(22) PCT Filed: Oct. 15, 2020

(86) PCT No.: PCT/EP2020/079126
§ 371 (c)(1),
(2) Date: Apr. 15, 2022

(87) PCT Pub. No.: WO2021/074342
PCT Pub. Date: Apr. 22, 2021

(65) Prior Publication Data
US 2023/0279260 A1 Sep. 7, 2023

Related U.S. Application Data

(60) Provisional application No. 62/916,310, filed on Oct. 17, 2019.

(30) Foreign Application Priority Data

Nov. 8, 2019 (EP) .................................... 19207891

(51) Int. Cl.
C09D 175/06 (2006.01)
C08G 18/42 (2006.01)
C09D 5/03 (2006.01)

(52) U.S. Cl.
CPC ....... C09D 175/06 (2013.01); C08G 18/4202 (2013.01); C09D 5/035 (2013.01)

(58) Field of Classification Search
None
See application file for complete search history.

(56) References Cited

U.S. PATENT DOCUMENTS 5,786,419 A * 7/1998 Meier-Westhues ......................... C08G 18/798 528/65
6,599,992 B1 * 7/2003 Brunmair ............. C09D 167/00 525/934

(Continued)

FOREIGN PATENT DOCUMENTS

CN 107207901 A * 9/2017 ............ C08F 290/06
EP 2065218 A1 6/2009

OTHER PUBLICATIONS

Coatings World—polyurethane coatings w-polycarbonate diols—2014 (Year: 2014).*

(Continued)

Primary Examiner — John Vincent Lawler

(57) ABSTRACT

The present disclosure describes a low gloss polyurethane one component powder coating composition comprising 90 to 100 wt % of a resin system comprising a thermosetting resin, an isocyanate curing agent for reacting with the thermosetting resin, and a polycarbonate diol, wherein: the thermosetting resin comprises a first hydroxyl functional polyester resin (i) having a hydroxyl value of between 200 and 250 mgKOH/g and a second hydroxyl functional polyester resin (ii) having a hydroxyl value of between 20 and 40 mgKOH/g, the weight ratio of (i):(ii) ranges from 15:85 to 35:65, the isocyanate curing agent comprises at least one unblocked uretdione curing agent, the ratio of isocyanate groups of the curing agent to hydroxyl group of the ther- (Continued)

mosetting ranges between 0.8 to 1.2, and the total weight % of the polycarbonate diol in the coating composition ranges from 1 to 10 wt % based on the total weight of the coating composition.

13 Claims, 1 Drawing Sheet

(56) References Cited

U.S. PATENT DOCUMENTS

| | | | | |
|---|---|---|---|---|
| 6,653,394 | B1* | 11/2003 | Meisenburg | C08G 18/0823 524/840 |
| 7,767,778 | B2 | 8/2010 | Rawlins et al. | |
| 9,206,320 | B1* | 12/2015 | Daly | C08G 18/42 |
| 2002/0095019 | A1* | 7/2002 | Gras | C08G 18/8016 528/73 |
| 2005/0119437 | A1* | 6/2005 | Wenning | C08G 18/0895 528/44 |
| 2005/0222364 | A1 | 10/2005 | Rawlins et al. | |
| 2007/0142608 | A1 | 6/2007 | Laas et al. | |
| 2009/0018263 | A1* | 1/2009 | Marelli | C09D 175/06 524/599 |
| 2011/0136972 | A1* | 6/2011 | Flosbach | C08G 18/73 524/590 |
| 2011/0300294 | A1* | 12/2011 | Nachtman | B43L 1/10 427/532 |
| 2012/0107619 | A1* | 5/2012 | Kitagawa | C09D 133/12 524/507 |
| 2013/0230696 | A1* | 9/2013 | Sobek | C09D 167/00 428/147 |
| 2018/0312719 | A1* | 11/2018 | Mistry | C09D 4/06 |

OTHER PUBLICATIONS

Tanaka—CN 107207901 A—MT—urethane resin coating—polycarbonate diols—2017 (Year: 2017).*
Search Report of Corresponding Application No. EP 19207891, dated Mar. 23, 2020.
Search Report and Written Opinion of Corresponding Application No. PCT/EP2020/079126, mailed Jan. 27, 2021.
F. Min et al., Synthesis and Research of High-Performance Transparent Polyurethane Elastic Resin, Polyurethane Industry, 2009, vol. 24, No. 1, pp. 18-23.
Engish translation of F. Min et al., Synthesis and Research of High-Performance Transparent Polyurethane Elastic Resin, Polyurethane Industry, 2009, vol. 24, No. 1, pp. 18-23.
Wood Adhesives and Gluing Technology, Xianchun Yu et al., "7.2.1 Main Raw Materials," pp. 121-124, China Light Industry Press.
English Translation of Wood Adhesives and Gluing Technology, Xianchun Yu et al., "7.2.1 Main Raw Materials," pp. 121-124, China Light Industry Press.
Polycarbonate Diols Eternacoll® PH, High Performance for your Polyurethane Coatings, UBE Chemical Europe S.A., pp. 1-2.
Novel Polyurethane Coatings Obtained with Polycarbonate Diol, Coatings World, Dec. 15, 2014, pp. 1-3.
Polycarbonate Diols, Tri-Iso, pp. 1-2.
Tailor-Made Polyurethane Powders for High-Quality Coatings, PCI Paint & Coating Industry, Jun. 1, 2000, pp. 1-13.

* cited by examiner

LOW GLOSS POLYURETHANE COATING COMPOSITIONS

CROSS-REFERENCE TO RELATED APPLICATIONS

This application is a 35 U.S.C. § 371 national phase application of PCT Application No. PCT/EP2020/079126 (published as WO 2021/074342 A1), filed on Oct. 15, 2020, which claims the benefit of priority to U.S. Application No. 62/916,310, filed Oct. 17, 2019 and EP Application No. 19207891.3, filed on Nov. 8, 2019, each of which is incorporated herein by reference in its entirety.

This patent application relates to lower gloss polyurethane powder coating compositions which have potential application in multiple industrial powder coating markets where transparency, low gloss and durability are important.

Powder coating compositions are solid compositions that generally comprise a solid film-forming resin or mixtures of different resins, and typically one or more pigments and additives such as plasticizers, stabilizers, flow aids and extenders. The resin may be a thermosetting resin, which means that it is reactive with a crosslinking agent (which may itself be another resin). Generally, the resins have a glass transition temperature ($T_g$) above 30° C. Powder coating compositions have become increasingly important because they give off very little or no volatile material to the environment when cured. Typically, any such emissions are limited to by-products of the curing reaction, such as blocking agents or volatile condensation products.

Powder coatings have been used to provide textured or matte surface coatings for various articles. By matte finish, we mean that the gloss of the coating after it has been cured is low. The concept of gloss is a visual impression resulting from surface evaluation that is measured by a gloss meter. The measurement results of a gloss meter are related to the amount of reflected light from a black glass standard with a defined refractive index. Smooth and highly polished surfaces reflect images distinctly. On rough surfaces, the light is diffusely scattered in all directions. Gloss can be measured using 60° and 85° gloss head.

There are a few ways the industry achieves matte finishes. It is common to add a matting agent that may be a reactive component or may be an inert component such as chalk or feldspar. Pigment is known to contribute to the matting effect. Making a transparent (clear) coating containing no pigments is therefore inherently difficult.

Matte finishes in powder coatings may also be achieved by crosslinking two epoxy resins with a curing agent, such as a mono- or di-salt of a polycarboxylic acid and cyclic amidine. One of the epoxy resins cures more quickly with the curing agent than the other epoxy resin cures. The difference in reactivity causes separation zones in the film formation during curing resulting in a micro texture in the coating surface which scatters light, providing a low-gloss surface. These epoxy based coatings are typically not ultraviolet-durable or stable, and as such, the components of the coating degrade when exposed to ultraviolet light.

Some commercial non-pigmented matte powder coating products are based on polyester-acrylic hybrid technology. Polyester-acrylic hybrid technology means a carboxyl polyester resin crosslinked with an acrylic type hardener. They also comprise hydroxy alkylamide (HAA) or triglycidyl isocyanurate (TGIC) crosslinkers. Whilst these non-pigmented products achieve satisfactory performance with respect to adhesion, rub resistance, chemical resistance and corrosion resistance, there is a need for improvement in their appearance (smoothness, transparency, yellowness) and to further reduce their gloss.

Other commercial matte powder coatings employ a polyester resin with triglycidyl isocyanurate (TGIC) as a cross-linking agent. One way of lowering the gloss is to separately extrude and grind two different polyester resins and corresponding curing agents, which are then dry blended together. The polyester resins and curing agents are different, with different reactivities which causes separation zones in the film formation during curing lowering the gloss. However these two component polyester TGIC powder coatings are limited to gloss ranges only as low as 30 gloss units at a 60° angle. It is desirable to have transparent (non-pigmented) matte powder coating systems that yield lower gloss ranges.

The present application provides a powder coating composition which can form a matte and transparent coating with durability just as good as the leading commercial matte non-pigmented powder coatings on the market except with improved appearance and even lower gloss values.

A transparent coating means that the coating has a haze value of less than 60% when measured at a dry film thickness of 3.0 mils over glass panels in accordance with Standard method ASTM D1003. This method measures the light transmittance through a coated glass panel.

The present disclosure provides coating compositions that can form coatings having low gloss powder, matte and flat matte finishes. A lower gloss coating composition means that it can form a coating having a gloss value of less than 90, a matte coating means that it has a gloss value of less than 40 and greater than 20 and a flat matte coating means that it has a gloss value of less than 20, when measured at 60 degrees according to standard method ASTM D-523 on an Al panel (AL-Q).

Figure 1:
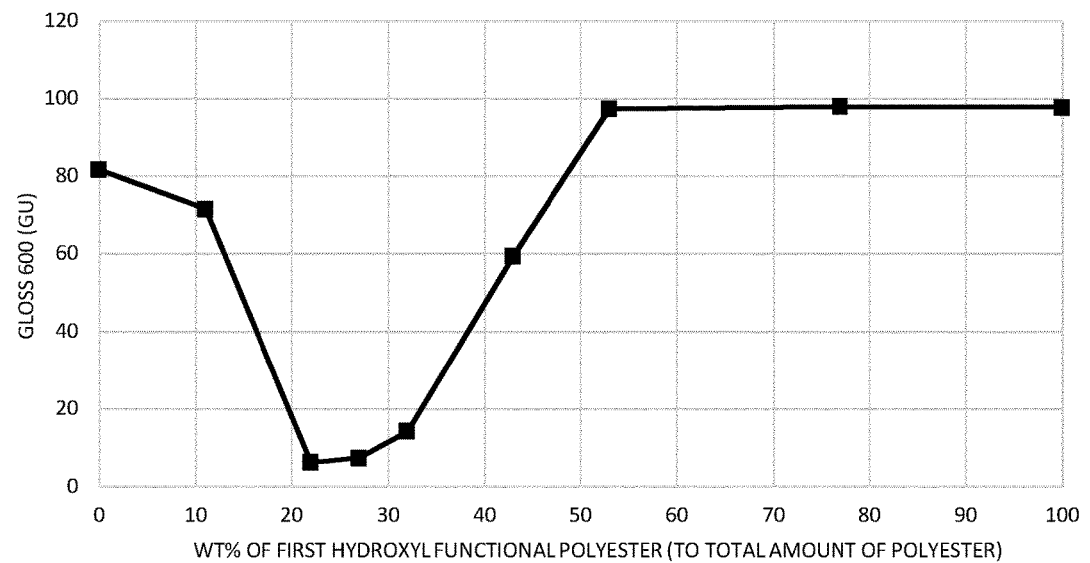
FIG. 1 is a graph showing the ratio of the first hydroxyl functional polyester resin to the second hydroxyl functional polyester resin versus gloss for coating composition Samples 2 to 10 in the Examples.

The coating composition according to the present disclosure is a one component composition. It can form durable, transparent and matte and flat matte finishes, despite not containing pigment.

In a first aspect, the present disclosure provides a one component powder coating composition comprising 90 to 100 wt % of a resin system comprising a thermosetting resin and curing agent for reacting with the thermosetting resin, and a polycarbonate diol wherein the thermosetting resin comprises a first hydroxyl functional polyester resin (i) having a hydroxyl value of between 200 and 250 mgKOH/g and a second hydroxyl functional polyester resin (ii) having a hydroxyl value of between 20 and 40 mgKOH/g, and the weight ratio of (i):(ii) ranges from 15:85 to 35:65, the curing agent comprises at least one unblocked uretdione curing agent, and, the ratio of isocyanate groups of the isocyanate curing agent to hydroxyl group of the thermosetting ranges between 0.8 to 1.2 the total weight % of the polycarbonate diol in the powder coating composition ranges from 1 to 10 wt % based on the total weight of the powder coating composition.

A one component powder coating composition means that the resins and curing agents are co-extruded and form part of the same powder particles in the powder coating composition. This is different to a two component powder coating composition which is a physical mixture of two separately extruded resins and corresponding curing agents.

The first hydroxyl functional polyester resin and second hydroxyl functional polyester resin are independently capable of reacting with the curing agent. The polyester resins must be present in a relative weight ratio of (i):(ii) ranging from 15:85 to 35:65 in order to provide a low gloss, matte or flat matte finish. Surprisingly, the ratios between the two polyester resins in the coating composition control the technical performance and appearance of the cured film.

Suitable polyesters include, for example and without limitation, those prepared by condensation of polyhydric alcohols and polycarboxylic acids, thus having at least one hydroxyl functional group and at least one carboxyl functional group.

Polyesters are those prepared by condensation polymerization reaction techniques well known in the art. Representative condensation polymerization reactions include polyesters prepared by the condensation of alcohols and carboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxyl-functional polyesters can be readily produced to provide a wide range of desired molecular weights, unsaturation content and performance characteristics.

The polyesters are derived from one or more aromatic and/or aliphatic and/or cycloaliphatic carboxylic acids, and/or the anhydrides thereof, and one or more aliphatic and/or aromatic polyols. The carboxylic acids include saturated and unsaturated polycarboxylic acids and derivatives thereof, such as maleic acid, fumaric acid, succinic acid, adipic acid, azelaic acid, dicyclopentadiene dicarboxylic acid, hexahydrophthalic anhydride, methyl-hexahydrophthalic anhydride, aromatic polycarboxylic acids, such as phthalic acid, isophthalic acid, terephthalic acid, etc. The carboxylic acids may include monocarboxylic acids, which can also be used for the preparation of hydroxyl-functional polyesters to control molecular weight, functionality, and other characteristic properties. The monocarboxylic acid may contain 6 to 18 carbon atoms, most preferably 7 to 14 carbon atoms, such as octanoic acid, 2-ethylhexanoic acid, isononanoic acid, decanoic acid, dodecanoic acid, benzoic acid, hexahydrobenzoic acid, and mixtures thereof. Suitable anhydrides may include maleic anhydride, phthalic anhydride, trimellitic anhydride, itaconic anhydride, citraconic anhydride, aconitic anhydride, acrylic anhydride, maleic anhydride, citraconic anhydride, cyclohexyl maleic anhydride, alkyl maleic anhydride, benzyl maleic anhydride, phenyl maleic anhydride, propyl maleic anhydride, and 1,2-diethyl maleic anhydride, individually or in combinations thereof.

Representative aliphatic and/or aromatic polyols, which may be saturated or unsaturated polyols, which can be reacted in stoichiometric excess with the carboxylic acids to produce hydroxyl-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy) cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

The first hydroxyl functional polyester (i) has a hydroxyl value of 200 and 250 mgKOH/g and the second hydroxyl functional polyester resin (ii) has a hydroxyl value of between 20 and 40 mgKOH/g. The hydroxyl value (OHV or OH value) is the milligrams of potassium hydroxide equivalent to the hydroxyl content in one gram of hydroxyl functional polyester. Hydroxyl value (OH value) may be determined experimentally according to ASTM Method E222 (revision10), Test Method A.

The weight ratio of (i):(ii) ranges from 15:85 to 35:65. In some embodiments, the weight ratio of (i):(ii) may range from 20:80 to 30:70.

The first hydroxyl functional polyester resin may, for example, have a glass transition temperature ($T_g$) of between 50 and 55° C. The second hydroxyl functional polyester resin may, for example, have a $T_g$ of between 55 and 60° C. The glass transition temperature of the polyester resins may be determined according to ASTM E 1356 using a differential scanning colorimeter (MDSC Q200TA).

The first hydroxyl functional polyester resin may comprise for example, a polyester commercially available from Allnex under the name Crylcoat E 04362.

The second hydroxyl functional polyester resin may comprise for example, a polyester commercially available from Allnex under the name Crylcoat E 04375.

The resin system of the one-component powder coating composition comprises at least the thermosetting resin and curing agent as herein described and claimed. Components in the resin system form a coherent coating film when cured. The resin system may optionally also comprise a thermoplastic resin.

The resin system also comprises a polycarbonate diol component. Surprisingly, the addition of the polycarbonate diol provides a unique silky and soft touch of a cured film surface similar to surfaces of cured liquid matte polyurethane products on the market.

The total weight % of the polycarbonate diol in the powder coating composition ranges from 1 to 10 wt % based on the total weight of the powder coating composition.

The polycarbonate diol preferably has a hydroxyl value of between 20 and 50 mgKOH/g. It may have a number average molecular weight of between 1500 and 4000 g/mol, for example between 2000 and 4000 g/mol. The number average molecular weight of a polymer is the number average molecular weight as measured by gel permeation chromatography (GPC) calibrated with polystyrene standards.

The polycarbonate diol may have the following formula, $HO-[-R^2-OCO]_n-O-R^2-OH$, wherein $R^2$ is an aliphatic hydrocarbon chain having 2 to 12 carbon atoms, preferably 4 to 7 carbon atoms, for example 5 to 6 carbon atoms. The aliphatic hydrocarbon chain is preferably a linear hydrocarbon chain. n is a number, preferably between 3 to 30, for example 4 to 20 or 5 to 15.

The polycarbonate diol may be added to the powder coating composition as a physical mixture with the second hydroxyl functional polyester. The mixture of the polycarbonate diol and the second hydroxyl functional polyester can be produced by mixing together the polycarbonate diol and the second hydroxyl functional polyester at an elevated temperature (e.g., 150° C. to 250° C.) at which both the polycarbonate diol and the second hydroxyl functional polyester are liquid and then allowed to cool to form a solid. For example, one method could be to mix a liquid polycarbonate diol into the second hydroxyl functional polyester straight after it has been polymerized and is still a liquid (at around 180° C.-220° C.) and then allow the mixture to cool.

Examples of the polycarbonate diol component include the following compounds: polycarbonate diol prepared by the transesterification reaction of an alkane diol with dimethyl carbonate, diethyl carbonate or diphenyl carbonate; and polycarbonate diols prepared from an alkane diol and phosgene by surface polycondensation reaction. Examples of the alkane diols include ethylene glycol, propylene glycol, 1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, 1,11-undecanediol, 1,12-dodecanediol, and cyclohexane 1,4-dimethanol. The polycarbonate diol may, for example, be prepared by reacting 1,5-pentane diol, 1,6-hexanediol and dimethyl carbonate (DMC). Such a method is described in RSC Adv., 2017, 7, 12550-12560. The result will be a random copolymer. If two diols are used to prepare the polycarbonate diol (e.g. 1,5-pentane diol, 1,6-hexanediol), the diols may be used in a molar ratio of 1:2 to 2:1.

A suitable polycarbonate diol component is commercially available from UBE Industries under the Eternacoll trade name.

The coating composition of the present disclosure requires an isocyanate curing agent, wherein the ratio of isocyanate groups of the curing agent to hydroxyl group of the thermosetting resin ranges between 0.8 to 1.2.

The hydroxyl group in the first and second hydroxyl functional polyesters are capable of reacting with the isocyanate group in the isocyanate curing agent. The reaction between isocyanate groups and hydroxyl groups is known in the art as a curing process for forming polyurethanes from hydroxyl functional polymers and isocyanate curing agents.

The isocyanate curing agent typically has an isocyanate equivalent weight ranging between 200 to 400 g/eq. Isocyanate Equivalent Weight means the number of grams of an isocyanate in order to have one equivalent of isocyanate groups (NCO). One equivalent of NCO groups=42.02 grams.

The isocyanate curing agent of the present disclosure comprises an unblocked uretdione curing agent.

Preferably at least 20 wt % of the isocyanate curing agent comprises an unblocked uretdione curing agent or at least 30 wt % of the isocyanate curing agent comprises an unblocked uretdione curing agent.

Uretdione curing agents are known in the art. They are obtainable by dimerizing isocyanates. In principle, the uretdione curing agents may be based on all known organic isocyanates. However, preference is given to using aliphatic, cycloaliphatic, aromatic or araliphatic diisocyanates or polyisocyanates having an NCO functionality of ≥2. Examples which may be mentioned are toluene diisocyanate (TDI), bis(isocyanatophenyl)methane and polyphenylpolymethylene polyisocyanates prepared by condensation of aniline and formaldehyde and subsequent phosgenation (MDI), 2,2'-dicyclohexyl-methane diisocyanate/2,4'-dicyclohexyl-methane diisocyanate/4,4'-dicyclohexyl-methane diisocyanate (H12MDI), norbornane diisocyanate (NBDI), hexamethylene diisocyanate (HDI), isophorone diisocyanate (IPDI) and bis(isocyanatocyclohexyl)methane. U.S. Pat. No. 8,134,014 discloses a process for preparing polyisocyanates having a high content of uretdione groups.

The isocyanate curing agent may additionally comprise a blocked uretdione curing agent. A blocked uretdione curing agent is when the free NCO groups which have not been converted into uretdione are blocked by methods known to those skilled in the art. Blocked isocyanates are used, for example, when it is desired that the isocyanate not react with the other polymer components at room temperature. The present inventors have found that the gloss of the coating composition can be controllably varied by varying the ratio of blocked to unblocked uretdione curing agents in the coating composition. The greater the proportion of unblocked uretdione then the more matte the coating will be (lower the Gloss Unit). Varying the proportion of blocked and unblocked uretdione is therefore a controllable way to vary the gloss level between from 20 to 10 to even lower.

In one embodiment, the isocyanate curing agent comprises 100% unblocked uretdione curing agent. Alternatively, the weight ratio of unblocked uretdione curing agent to blocked uretdione curing agent may range from 100:0 to 20:80. In some embodiments at least 20 wt %, at least 30 wt %, at least 40 wt %, at least 50 wt %, at least 60 wt %, at least 70 wt %, at least 80 wt %, at least 90 wt % or 100 wt % of the isocyanate curing agent is unblocked uretdione curing agent, wherein the wt % is based on the total weight of isocyanate curing agent in the coating composition. If the curing agent does not comprise 100% unblocked uretdione curing agent, the remainder of the isocyanate curing agent may comprise a blocked uretdione curing agent.

Isocyanate blocking agents include, without limitation, alcohols, phenols (e.g., phenol, nonylphenol cresol), oximes (e.g., butanone oxime, cyclohexanone oxime), malonates, lactams (e.g., ε-caprolactam), pyrazoles (e.g., dimethylpyrazole), imidazoles, triazoles, malonic and acetic esters and hydroxylamines. At room temperature, blocked isocyanates do not react with polyols at an appreciable rate. At elevated temperatures, the blocked polyisocyanate liberates the blocking agent, and the isocyanate reacts with the polyol.

A suitable commercially available unblocked uretdione is a cycloaliphatic uretdione available under the name Crelan® EF 403, available from Bayer AG. The amount of unblocked uretdione curing agent by weight may be about 1 to 35 percent, for example 3 to 30 percent by weight, of the powder coating composition.

A suitable commercially available blocked uretdione is a cycloaliphatic uretdione available under the name Vestagon® BF1540, which is a poly-uretdione of isophorone diisocyanate available from Evonik Degussa.

The powder coating may additionally comprise a non-isocyanate curing agent capable of reacting with carboxyl functional groups of the thermosetting resin. The curing agent for the carboxyl groups is preferably a compound having active hydrogens, e.g., beta-hydroxyalkylamides.

The non-isocyanate curing agent may comprise a beta-hydroxyalkylamide curing agent. Beta-hydroxyalkylamides provide a crosslinked polymer network which is hard, durable, corrosion resistant and solvent resistant. It is believed the beta-hydroxyalkylamides cure the coating through an esterification reaction with the carboxy-containing compounds forming multiple ester crosslinks. The hydroxyl functionality of the hydroxyalkylamide should be on an average basis of at least 2, preferably greater than 2, and more preferably from greater than 2, up to and including 4, in order to obtain an optimum curing. The amount of beta-hydroxyalkylamide curing agent by weight is preferably about 0.5 to 10 percent, and more preferably is about 1 to 7 percent by weight of the powder coating composition.

The beta-hydroxyalkylamides can be prepared, for example, by reacting a lower alkyl ester or mixture of esters of carboxylic acids with a beta-hydroxyalkylamine at a temperature ranging from ambient temperature up to about 200° C. depending on the choice of reactants and the presence or absence of catalyst. Suitable catalysts are basic catalysts including e.g., sodium methoxide, potassium methoxide, sodium butoxide, potassium butoxide, sodium hydroxide, and potassium hydroxide present preferably in amounts of about 0.1 to about 1 percent by weight based on the weight of the alkyl ester. A particularly suitable commercially available p-hydroxyalkylamide is Primid® QM-1260 available from EMS-Primid-Switzerland.

For example, the powder coating composition may comprise
40 to 70 wt % of a thermosetting resin,
15 to 40 wt % of an isocyanate curing agent, and
0.5 to 7 wt % of a non-isocyanate curing agent
wherein wt % is based on the total weight of the powder coating composition.

A curing accelerator (catalyst) may be used to speed up the curing process. The catalyst component may include tertiary amines, organometallic derivatives or salts of, bismuth, tin, iron, antimony, cobalt, thorium, aluminum, zinc, nickel, cerium, molybdenum, vanadium, copper, manganese and zirconium, metal hydroxides and metal carboxylates. Tertiary amines may include, but are not limited to, triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine. Suitable organometallic derivatives include di-n-butyl tin bis (mercaptoacetic acid isooctyl ester), dimethyl tin dilaurate, dibutyl tin dilaurate, dibutyl tin sulfide, stannous octoate, lead octoate, and ferric acetylacetonate. In one aspect, the catalyst is a stannous octoate known as Octaflow ST-70 commercially available from Estron Chemical.

The powder coating composition may comprise up to a maximum of 10 wt % of at least one or more other additives, for example up to a maximum of 8 wt %, up to a maximum of 5 wt % or up to a maximum of 3 wt %. The additives may be selected from the group consisting of, for example, pigments, antioxidants, UV light absorbers, flow additives, degassing agents and waxes.

Since the powder coating composition is transparent, the coating composition comprises very little, if any, pigment such as $TiO_2$. Preferably, the coating composition comprises 0 weight % of one or more pigments. Surprisingly, the transparent coatings of the invention can provide a very matte finish.

The antioxidants are compounds that reduce polymeric degradation caused by heat. The thermal degradation of a polymer can cause discoloration (typically yellowing) and a reduction in coating durability and mechanical performance. Examples of antioxidants include hindered phenol antioxidants, aromatic amines and organic phosphites and phosphonites.

The flow additives function to reduce the surface tension of the powder particles as they melt, flow and coalesce at both the coating/substrate and the coating/air surface. Suitable flow additives include amide modified polymeric esters, commercially available from Troy Chemical Company under the name Powdermate® 486CFL.

The powder coating composition may contain a degassing agent. A degassing agent allows the venting of volatile gases from the substrate during the fusing and curing stages of the powder coating process and thereby can prevent pinholing and other damage to the coating. Degassing agents include amide modified phenolated urea surfactants.

The UV light absorbers work by absorbing detrimental UV radiation and harmlessly releasing the energy as heat before it can cause polymer degradation. The degree of protection is a function of absorber concentration, coating thickness and the extinction or "efficiency" of the absorber. Suitable UV light absorbers include quinones, sterically hindered phenolic compounds, phosphonites, phosphites, thioethers, ortho-hydroxy tris-aryl-s-triazine compounds and HALS (hindered amine light stabilizers).

Most additives in powder coatings are blended with the resin and curing agent premix before extrusion and are thus incorporated in the resin/curing agent powder articles. However, sometimes very fine-particle-size additives (average particle size of around 10-40 nm), such as colloidal silica (pyrogenic or fumed silica) or alumina or aluminum hydroxide, are mixed with the powder after it has been extruded. When added at this stage in manufacturing, they are referred to as post-blend or dry blend additives.

The coating compositions according to the present disclosure may be applied to different types of substrates.

In another aspect, the present disclosure provides a coated substrate comprising a substrate coated with the one component powder coating composition described above. The substrate may be a metallic substrate such as steel (including light-gauge steel framing and steel beams and columns), aluminum, aluminum alloys. The substrate may also be a non-metallic substrate such as plastic or any other material that can withstand the conditions under which the cured powder coating is applied.

The coating composition can be used in various powder coating markets, including automotive, construction, hardware, building, or other industrial markets.

The compositions disclosed herein provide unique soft silky touch to the cured film surface similar to the surface of cured liquid matte polyurethane products, and matte to flat matte finish and improvement in flexibility.

As used herein, "e.g.," "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Unless otherwise indicated, weight % (wt %) of a component is based on the total weight of all the components in the powder coating composition.

Many variations in the present embodiments illustrated herein will be apparent to one of ordinary skill in the art and remain within the scope of the disclosure and their equivalents. The skilled person in the art will recognize many variations that are within the spirit of the disclosure and scope of any current or future claims. As used herein, the singular forms "a," "an," and "the" include plural referents unless the context clearly dictates otherwise. For example, reference to "a substituent" encompasses a single substituent as well as two or more substituents, and the like.

EXAMPLES

The following examples are provided by way of explanation and illustration and are not intended to limit the scope of the disclosure.

Test Methods
A. Appearance/Smoothness—This parameter was rated by comparing the coating film with standard panels available from USA Powder Coating Institute (PCI). The PCI is a non-profit organisation based in Kentucky USA, who provide Powder Coating Visual Smoothness Standards. The Powder Coating Visual Smoothness Standards are a set of glossy black ten panels, showing the normal degrees of smoothness achievable with powder coatings. The best smoothness is a surface rated with 10 and the poor smoothness is a surface rated with 1. The evaluation is done visually.
B. Film thickness of a cured film was measured using a Positector Model 6000 FN1, a coating thickness gauge from DeFlesko Corporation. Film thickness is reported as the highest of two readings measured in the top half and bottom half of the panel, in mils.
C. Gloss was measured using BYK micro-TRI-gloss meter with calibration tile tray Cat #4522/4527 or equivalents. The gloss of the cured film on Al panel (AL-Q) was measured per ASTM D-523. The 60-degree gloss was reported in all cases. The gloss was reported in gloss units. The lower the gloss unit, the lower the gloss (more matte).
D. Initial cross hatch adhesion test of lab samples to aluminium substrate was tested in accordance with ASTM D3359 cross cut tape test method B. This method provides for cutting through the film in a crosshatch pattern of specified spacing, and taping the cut area with Permacell #99 tape, and then rapidly removing the tape. The area with cuts is inspected to determine if paint has been loosened or removed and the area is given a rating. A test result was reported according to the test method from 0B-5B. 5B is a perfect rating and it means that none of the paint was removed. Panels tested are Al pre-treated.
E. Delta b value was determined on Leneta panels at 3.0 mils. Delta b was measured with Datacolor 600 spectrophotometer under CIE lab, Daylight D65/10°, using Leneta 4×12 inches panels (half black and half white) sprayed with powder samples at 3.0 mils and cured for 20 min at 375° F. The b value of the white side of Leneta panels is the standard value. Delta b is the measure in the change on the yellow-blue axis of the CIELAB color scale from the standard value. Positive delta b indicates that the color is yellower, negative delta b indicates that the color is bluer. A better result (indicating less change in color) is when the delta b value is closer to zero.
F. Methyl Ethyl Ketone (MEK) Rub resistance. A cotton tip applicator is saturated with MEK and rubbed a total of 50 double rubs back and forth across the surface of a test coating using approximately 2.6 cm strokes. Coatings exhibiting MEK resistance ratings of 4-5 have acceptable cure, physical properties and solvent resistance. The panels were rated as follow:
  Rating=5=Excellent chemical resistance—no rub-off of coating or pigmentation—no softening or dulling of coating surface.
  Rating=4=Very good chemical resistance—slight rub-off of coating or pigmentation.
  Rating=3=Fair to good chemical resistance—moderate slight rub-off of coating and pigmentation.
  Rating=2=Poor to fair chemical resistance—Heavy rub-off of coating pigmentation.
  Rating=1=Extremely poor or no chemical resistance—extreme rub-off of coating or pigmentation or complete rub to substrate.
G. Evaluation of transparency of samples was based on measurement of the Haze value. The test is based on light transmission through the film of samples sprayed at a thickness of 3.0 mils over glass panels. Measurements were taken with OnColor spectrophotometer set up for haze measurement, calibrated beforehand using black and white calibration tiles in accordance with Standard method ASTM D1003. More transparent coatings have a lower haze value (%).
H. Copper Accelerated Acetic Acid Salt spray (CASS) as per ASTM B368-09. This test method is used to determine corrosion resistance of the powder samples to the corrosive environment that could be created by CASS solution. Three test panels (Al treated) sprayed with powder samples at standard film thickness (3 mils) and cured at standard cure are vertical scribed as agreed between parties with an approved cutting device and then panels are placed in vertical position into a test chamber where a test solution consisting of 5% sodium chloride solution in DI water is treated with copper chloride for every liter of salt solution. The pH of the solution should be 3.0-3.1. The solution is then treated with glacial acetic acid to adjust the pH to 3.1-3.3 and then mixed with air and sprayed out into the test chamber using an atomized spray nozzle. The test duration is 168 hours. The test panels are then washed, dried off with compressed air and inspected for corrosion along the scribe, blisters, and corrosion at the edges. Three panels for each sample were tested. Internal laboratory tested panels were evaluated according with OEM specification FCA MS PA 6-7 which specifies as acceptable performance criteria 3.0 mm max creep from line scribe lines.
I. A detailed analysis of the topography of the surfaces exposed and non-exposed to xenon light for samples sprayed over primer and liquid basecoat, was conducted in analytical lab using a scanning electronic microscope SEM and Laser Scanning Confocal Microscopy (LSCM). Imaging was performed with a Hitachi S-3400N SEM with a 15 kV acceleration voltage and a 50 Pa atmosphere. The sample was mounted at a 45° angle for imaging. A Keyence VK-8700 laser scanning confocal microscope was used to image the surface profiles of the samples. A 20×/0.46 objective was utilized with both red laser and white light sources. VK analyzer software was used for image post processing including first-order tilt correction and roughness analysis. The normal height cut-off filter in the analyzer software was applied on all images. The average surface roughness over an area (Sa) is the roughness analysis parameter used to quantify the surface topography of the samples. The Sa value expresses the absolute difference in height of each point compared to the arithmetical mean plane through the surface. The Sa values rank the roughness of the samples, from highest to lowest, in the order of B>A>C, which corresponds well to the visual observations. Sample A=non-exposed 3 coat panel, sample B=3 coat panel exposed for 2250 hours, and sample C=3 coat panel exposed for 3750 hours.

Application of Example Coating Compositions

Unless otherwise specified, coating compositions were sprayed using a Nordson Versa electrostatic spray gun (Nordson Corporation, Amherst, Ohio, USA) onto aluminum panels (AL-Q panels) size 3 in.×6 in. or 4 in.×12 in. from Q-panel Corporation USA. Some of the test panels were pre-treated and others were not pre-treated, depending on the test to be run. The coatings were cured for 20 min. to a metal substrate surface temperature of 375° F. (191° C.). Dry film thickness is 3 mils.

Coating Composition Samples 1 and 2—Comparison with Leading Commercial Powder Product Coating composition Samples 1 and 2 according to the present disclosure were compared with a leading matte non-pigmented polyester-acrylic hybrid powder coating product on the market provided by AkzoNobel (Composition A*). Composition A* is a one component polyester/acrylic hybrid matte non-pigmented powder coating composition employing a carboxyl polyester resin and a glycidyl functional acrylic polymer as curing agent, as well as hydroxyl alkyl amide and other additives.

Coating composition Samples 1 and 2 were prepared by blending all the ingredients in Table 1 except the dry flow additive with a Prism mixer for 30 seconds at 2000 rpm, extruding with a long barrel extruder WP-30 twin screws extruder (Werner Pfleiderer, Ramsey, New Jersey, USA) at extrusion speed of 400 rpm, torque at 15-30% and extrusion temperature at max. 93° F. The molten extruded material was fed through cooled chilled rolls to form a solid sheet that was broken into small different sized chips. Dry flow additive was manually added and mixed with the chips by bag shaking for 30 seconds. The chips were ground into fine powder using a Brinkman grinder with 0.5 mm screen size and then screened through a USA 200 mesh (75 microns) from Vorti Sieve, Salem, Ohio, USA.

TABLE 1

| Component (wt %) | Sample 1 | Sample 2 |
|---|---|---|
| Hydroxyl functional polyester, OHV 30[1] | 48.902 | 0.000 |
| 90% Hydroxyl functional polyester OHV 30 + 10% polycarbonate diol[2] | 0.000 | 50.200 |
| Hydroxyl polyester OHV 220[3] | 16.168 | 16.767 |
| Amide modified polyether[4] | 1.497 | 1.497 |
| Amide modified phenolated urea[5] | 0.499 | 0.499 |
| Cycloaliphatic uretdione without blocking agent[6] | 27.745 | 12.924 |
| Poly uretdione adduct internally blocked[7] | 0.000 | 12.924 |
| Tin stannous octoate[8] | 0.998 | 0.998 |
| Oligomeric hindered amine[9] | 0.499 | 0.499 |
| 2 hydroxyl phenyl s thiazine[10] | 0.998 | 0.998 |
| Sterically hindered phenolic phosphite[11] | 0.499 | 0.499 |
| Hydrolytically organo phosphite[12] | 0.499 | 0.499 |
| Hydroxyl alkyl amide[13] | 1.497 | 1.497 |
| Aluminum oxide dry flow additive[14] | 0.199 | 0.199 |

[1]CRYLCOAT E 04375 (OHV 30 mg KOH/g), Allnex Inc. USA (polymeric resin)
[2]10 wt % ETERNACOLL PH 300 UBE Spain and 90 wt % CRYLCOAT E04375 Allnex USA (polymeric resin)
[3]CRYLCOAT E 04362 (OHV 220 mg KOH/g), Allnex USA (polymeric resin)
[4]POWDERMATE 486CFL, Troy Chemical Corporation (flow additive)
[5]POWDERMATE 542DG, Troy Chemical Corporation (degassing wax)
[6]CRELAN EF 403 (LS 2147), Bayer AG USA (crosslinker)
[7]VESTAGON B1540, Evonik (crosslinker)
[8]OCTAFLOW ST-70, Estron Chemicals USA (catalyst)
[9]HALS STABILIZER TINUVIN 622 LD, Basf USA (UV absorber)
[10]ADDITIVE TINUVIN 405, Basf USA (UV absorber)
[11]ANTIOXIDANT IRGAFOS 1076, Basf USA (antioxidant)
[12]ANTIOXIDANT IRGAFOS 168, Basf USA (antioxidant)
[13]Primid QM1260, EMS Chemie NA (crosslinker)
[14]Evonik Corporation (flow additive)

TABLE 2

| Test | | Sample 1 | Sample 2 | Composition A* |
|---|---|---|---|---|
| A | PCI rating (appearance) | 9 | 9 | 7/8 |
| B | Film thickness, mils | 3.0 | 3.0 | 3.0 |
| C | Gloss @ 60°, units (AL-Q panel sprayed at 3.0 mils) | 24.3 | 19.1 | 31 |
| D | Initial cross hatch adhesion (panel sprayed at 3.0 mils) | 5B | 5B | 5B |
| E | Delta b on Leneta white panels at 3.0 mils | 2.1 | 2.1 | 4.1 |
| F | MEK rub resistance | 4/5 | 4/5 | 4/5 |
| G | Transparency (Haze value %) at a film measured at 3 mils (on glass panel) | 60 | 55 | >80 |
| H | Corrosion resistance: Undercut corrosion rating | <1 mm (pass) | <1 mm (pass) | <1 mm (pass) |
| H | Corrosion resistance Blister rating | 10 (pass) | 10 (pass) | 10 (pass) |

*Comparative commercial product

The coating properties of Samples 1 and 2 and the standard commercial product were tested in accordance with test methods A to H above. The test results are provided in Table 2. The test results show that the coatings of the present disclosure have superior appearance (smoothness, transparency, haze, yellowness) compared with the leading commercial polyester-acrylic hybrid powder coating, and similar durability properties.

Coating Composition Samples 2 to 10—how the Ratio of the First Hydroxyl Functional Polyester Resin to the Second Hydroxyl Functional Polyester Resin Affects Gloss of Coating Coating composition Samples 2 to 10 were prepared by blending all the ingredients in Table 3 except the dry flow additive with a Prism mixer for 30 seconds at 2000 rpm, extruding with a long barrel extruder WP-30 twin screws extruder (Werner Pfleiderer, Ramsey, New Jersey, USA) at extrusion speed of 400 rpm, torque at 15-30% and extrusion temperature at max. 200° F. The molten extruded material was fed through cooled chilled rolls to form a solid sheet that was broken into small different sized chips. Dry flow additive was manually added and mixed with the chips by bag shaking for 30 seconds. The chips were ground into fine powder using the Brinkman grinder with 0.5 mm screen size and then screened through a USA 200 mesh (75 microns) from Vorti Sieve, Salem, Ohio, USA.

The formulations of Samples 2-10 are the same except the ratio of the first hydroxyl functional polyester resin (CRYLCOAT E 04362) to the second hydroxyl functional polyester resin (CRYLCOAT E04375) was varied between 0:100 to 100:0.

The coating compositions were applied to a AL-Q panel coated with black base coat (at 3.0 mil thickness). The gloss of all the coatings was measured in Gloss Units using a BYK micro-TRI-gloss meter according to the gloss test method noted above. Results are shown in Table 4 and FIG. 1.

Coating Composition Samples 11 to 17—how the Ratio Unblocked Uretdione to Blocked Uretdione Affects Gloss of the Coating Coating composition Samples 11 to 17 were prepared by blending all the ingredients in Table 5 except the dry flow additive with a Prism mixer for 30 seconds at 2000 rpm, extruding with a long barrel extruder WP-30 twin screws extruder (Werner Pfleiderer, Ramsey, New Jersey, USA) at extrusion speed of 400 rpm, torque at 15-30% and extrusion temperature at max. 200° F. The molten extruded material was fed through cooled chilled rolls to form a solid sheet that was broken into small different sized chips. Dry flow additive was manually added and mixed with the chips by bag

TABLE 3

| Component (wt %) | Sample # | | | | | | | | |
|---|---|---|---|---|---|---|---|---|---|
| | 3* | 4* | 5* | 6* | 7 | 2 | 8 | 9* | 10* |
| 90% Hydroxyl functional polyester OHV 30[1] + 10% polycarbonate diol[2] | 0 | 16.767 | 33.4835 | 40.220 | 46.906 | 50.200 | 53.593 | 60.279 | 66.967 |
| Hydroxyl polyester OHV 220[3] | 66.967 | 50.200 | 33.4835 | 26.747 | 20.061 | 16.767 | 13.374 | 6.688 | 0.000 |
| Amide modified polyether[4] | 1.497 | 1.497 | 1.497 | 1.497 | 1.497 | 1.497 | 1.497 | 1.497 | 1.497 |
| Amide modified phenolated urea[5] | 0.499 | 0.499 | 0.499 | 0.499 | 0.499 | 0.499 | 0.499 | 0.499 | 0.499 |
| Cycloaliphatic uretdione without blocking agent[6] | 12.924 | 12.924 | 12.924 | 12.924 | 12.924 | 12.924 | 12.924 | 12.924 | 12.924 |
| Poly uretdione adduct internally blocked[7] | 12.924 | 12.924 | 12.924 | 12.924 | 12.924 | 12.294 | 12.924 | 12.924 | 12.924 |
| Tin stannous octoate[8] | 0.998 | 0.998 | 0.998 | 0.998 | 0.998 | 0.998 | 0.998 | 0.998 | 0.998 |
| Oligomeric hindered amine[9] | 0.499 | 0.499 | 0.499 | 0.499 | 0.499 | 0.499 | 0.499 | 0.499 | 0.998 |
| 2 hydroxyl phenyl s thiazine[10] | 0.998 | 0.998 | 0.998 | 0.998 | 0.998 | 0.998 | 0.998 | 0.998 | 0.998 |
| Sterically hindered phenolic phosphite[11] | 0.499 | 0.499 | 0.499 | 0.499 | 0.499 | 0.499 | 0.499 | 0.499 | 0.499 |
| Hydrolytically organo phosphite[12] | 0.499 | 0.499 | 0.499 | 0.499 | 0.499 | 0.499 | 0.499 | 0.499 | 0.499 |
| Hydroxyl alkyl amide[13] | 1.497 | 1.497 | 1.497 | 1.497 | 1.497 | 1.497 | 1.497 | 1.497 | 1.497 |
| Aluminum oxide dry flow additive[14] | 0.199 | 0.199 | 0.199 | 0.199 | 0.199 | 0.199 | 0.199 | 0.199 | 0.199 |

Components 1 to 14 are the same as used in Samples 1 and 2
*Comparative Sample

TABLE 4

| | Sample # | | | | | | | | |
|---|---|---|---|---|---|---|---|---|---|
| | 3* | 4* | 5* | 6* | 7 | 2 | 8 | 9* | 10* |
| Percentage of 1st OH functional polyester to total polyester in coating composition | 100 | 77 | 53 | 43 | 32 | 27 | 22 | 11 | 0 |
| Percentage of 2nd OH functional polyester to total polyester in coating composition | 0 | 23 | 47 | 57 | 68 | 73 | 78 | 89 | 10 |
| AL-Q substrate top coated with black basecoat (Gloss Unit) | 97.6 | 97.8 | 97.2 | 59.4 | 14.2 | 7.3 | 6.1 | 71.5 | 81.6 |

*Comparative Sample

The results show that when the resin comprises a first hydroxyl functional polyester resin (i) having a hydroxyl value of between 200 and 250 mgKOH/g and a second hydroxyl functional polyester resin (ii) having a hydroxyl value of between 20 and 40 mgKOH/g, and the weight ratio of (i):(ii) ranges from 15:85 to 35:65, the gloss of the coating is significantly lower.

shaking for 30 seconds. The chips were ground into fine powder using the Brinkman grinder with 0.5 mm screen size and then screened through a USA 200 mesh (75 microns) from Vorti Sieve, Salem, Ohio, USA.

The formulations of Samples 11 to 17 are the same except the ratio of unblocked uretdione to blocked uretdione was varied between 0:100 to 100:0. The total weight of isocyanate curing agent is the same in all examples. The weight ratio of first hydroxyl functional polyester to second hydroxyl functional polyester was the same (27:73) in all cases.

Figure 2:
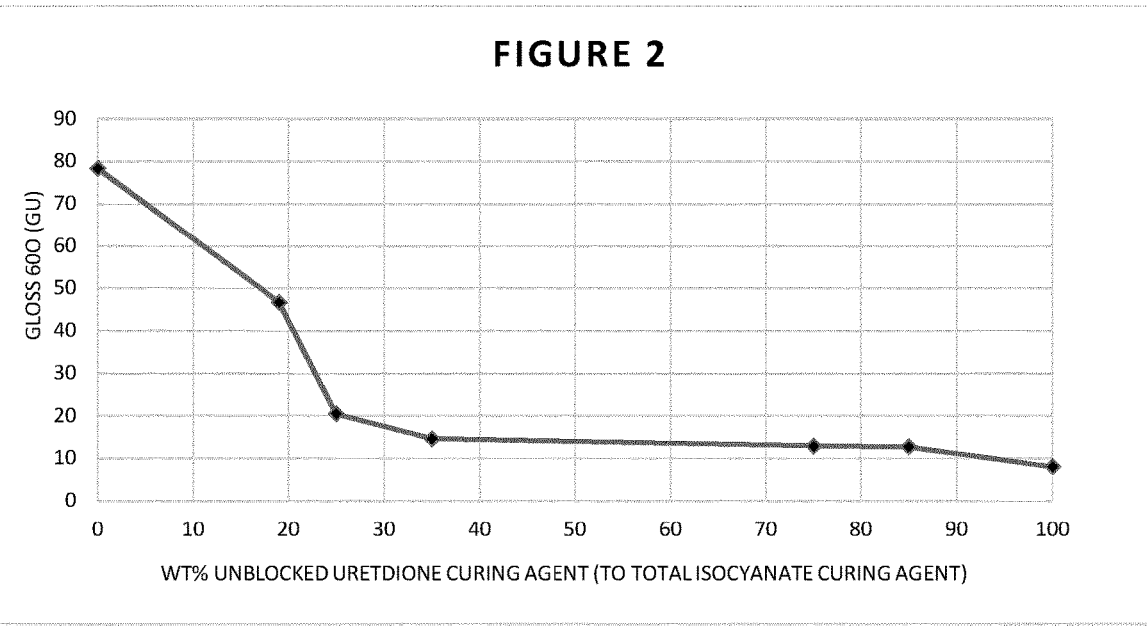
FIG. 2 is a graph showing the ratio unblocked uretdione to blocked uretdione versus gloss for coating composition Samples 11 to 17 in the Examples.

The coating compositions were applied to an AL-Q panel coated with black base coat (at 3.0 mil thickness). The gloss of all the coatings was measured in Gloss Units using a BYK micro-TRI-gloss meter according to the gloss test method noted above. Results are shown in Table 6 and FIG. 2.

was manually added and mixed with the chips by bag shaking for 30 seconds. The chips were ground into fine powder using a Brinkman grinder with 0.5 mm screen size and then screened through a USA 200 mesh (75 microns) from Vorti Sieve, Salem, Ohio, USA.

The formulations of Samples 1 and 18 are practically the same except that the resin system of Sample 18 includes polycarbonate diol.

TABLE 5

| Component (wt %) | Sample # | | | | | | |
|---|---|---|---|---|---|---|---|
| | 11 | 12 | 13 | 14 | 15 | 16 | 17* |
| 90% Hydroxyl functional polyester OHV 30[1] + 10% polycarbonate diol[2] | 48.603 | 48.603 | 48.603 | 48.603 | 48.603 | 48.603 | 48.603 |
| Hydroxyl polyester OHV 220[3] | 16.168 | 16.168 | 16.168 | 16.168 | 16.168 | 16.168 | 16.168 |
| Amide modified polyether[4] | 1.497 | 1.497 | 1.497 | 1.497 | 1.497 | 1.497 | 1.497 |
| Amide modified phenolated urea[5] | 0.499 | 0.499 | 0.499 | 0.499 | 0.499 | 0.499 | 0.499 |
| Cycloaliphatic uretdione without blocking agent[6] | 28.044 | 23.852 | 21.058 | 9.781 | 6.986 | 5.29 | 0.000 |
| Poly uretdione adduct internally blocked[7] | 0.000 | 4.192 | 6.986 | 18.263 | 21.058 | 22.754 | 28.044 |
| Tin stannous octoate[8] | 0.998 | 0.998 | 0.998 | 0.998 | 0.998 | 0.998 | 0.998 |
| Oligomeric hindered amine[9] | 0.499 | 0.499 | 0.499 | 0.499 | 0.499 | 0.499 | 0.499 |
| 2 hydroxyl phenyl s thiazine[10] | 0.998 | 0.998 | 0.998 | 0.998 | 0.998 | 0.998 | 0.998 |
| Sterically hindered phenolic phosphite[11] | 0.499 | 0.499 | 0.499 | 0.499 | 0.499 | 0.499 | 0.499 |
| Hydrolytically organo phosphite[12] | 0.499 | 0.499 | 0.499 | 0.499 | 0.499 | 0.499 | 0.499 |
| Hydroxyl alkyl amide[13] | 1.497 | 1.497 | 1.497 | 1.497 | 1.497 | 1.497 | 1.497 |
| Aluminum oxide dry flow additive[14] | 0.199 | 0.199 | 0.199 | 0.199 | 0.199 | 0.199 | 0.199 |

Components 1 to 14 are the same as used in composition Samples 1 and 2
*Comparative Sample

TABLE 6

| | Sample # | | | | | | |
|---|---|---|---|---|---|---|---|
| | 11 | 12 | 13 | 14 | 15 | 16 | 17* |
| Ratio of blocked/unblocked isocyanate | 0/100 | 15/85 | 25/75 | 65/35 | 75/25 | 81/19 | 100/0 |
| AL-Q top coated with black basecoat (Gloss Unit) | 7.9 | 12.6 | 12.8 | 14.5 | 20.4 | 46.6 | 78.3 |

*Comparative Example

The results show a reduction in gloss when greater than 20 wt % of the isocyanate curing agent comprises unblocked uretdione isocyanate curing agent. Formulating with unblocked uretdione isocyanate curing agent makes matte and flat matte transparent finishes possible.

Coating Composition Sample 18—how Polycarbonate Diol Affects the Aesthetics of the Coating Coating composition Sample 18 was prepared by blending all the ingredients in Table 7 except the dry flow additive with a Prism mixer for 30 seconds at 2000 rpm, extruding with a long barrel extruder WP-30 twin screws extruder (Werner Pfleiderer, Ramsey, New Jersey, USA) at extrusion speed of 400 rpm, torque at 15-30% and extrusion temperature at max. 93° F. The molten extruded material was fed through cooled chilled rolls to form a solid sheet that was broken into small different sized chips. Dry flow additive

TABLE 7

| Component (wt %) | Sample 1 | Sample 18 |
|---|---|---|
| Hydroxyl functional polyester, OHV 30[1] | 48.902 | 0.000 |
| 90% Hydroxyl functional polyester OHV 30 + 10% polycarbonate diol[2] | 0.000 | 48.700 |
| Hydroxyl polyester OHV 220[3] | 16.168 | 16.200 |
| Amide modified polyether[4] | 1.497 | 1.500 |
| Amide modified phenolated urea[5] | 0.499 | 0.500 |
| Cycloaliphatic uretdione without blocking agent[6] | 27.745 | 28.100 |
| Poly uretdione adduct internally blocked[7] | 0.000 | 0.000 |
| Tin stannous octoate[8] | 0.998 | 1.000 |
| Oligomeric hindered amine[9] | 0.499 | 0.500 |
| 2 hydroxyl phenyl s thiazine[10] | 0.998 | 1.000 |
| Sterically hindered phenolic phosphite[11] | 0.499 | 0.500 |
| Hydrolytically organo phosphite[12] | 0.499 | 0.500 |
| Hydroxyl alkyl amide[13] | 1.497 | 1.500 |
| Aluminum oxide dry flow additive[14] | 0.199 | 0.200 |

Components 1 to 14 are the same as listed for Table 1 above.

Significant surface topography differences were observed between Sample 1 and Sample 18 at the different exposure levels. The visual differences in topography correspond to the calculated average roughness parameter (Sa). The lower the Sa, the silkier and smoother the surface.

As shown in Table 8 below, the same trends in Sa are found within each sample set. The Sa of the 2250 hour exposure samples are greatest, followed by the 0 hour exposure samples, and the samples are smoothest after 3750 hours of Xe exposure. The coating made with Sample 1 is always rougher than the coating made with Sample 18 (containing polycarbonate diol) when comparing equivalent exposure time.

TABLE 8

| Xe Exposure | Sa Value | |
| --- | --- | --- |
| | Sample 1 | Sample 18 |
| 0 hrs | 1.35 | 1.14 |
| 2250 hrs | 1.92 | 1.36 |
| 3750 hrs | 1.25 | 0.83 |

The invention claimed is:

1. A one component powder coating composition comprising 90 to 100 wt % of a resin system comprising a thermosetting resin, an isocyanate curing agent for reacting with the thermosetting resin, and a polycarbonate diol wherein
   (a) the thermosetting resin comprises a first hydroxyl functional polyester resin (i) having a hydroxyl value of between 200 and 250 mgKOH/g, and a second hydroxyl functional polyester resin (ii) having a hydroxyl value of between 20 and 40 mgKOH/g, and the weight ratio of (i):(ii) ranges from 15:85 to 35:65,
   (b) the isocyanate curing agent comprises at least one unblocked uretdione curing agent,
   (c) the ratio of isocyanate groups of the curing agent to hydroxyl group of the thermosetting ranges between 0.8 to 1.2, and
   (d) the total weight % of the polycarbonate diol in the powder coating composition ranges from 1 to 10 wt % based on the total weight of the powder coating composition.

2. The one component powder coating composition of claim 1 comprising a maximum of 10 wt % of one or more other additives.

3. The one component powder coating composition according to claim 1 comprising 0 wt % of pigments.

4. The one component powder coating composition according to claim 1, wherein the isocyanate curing agent has an isocyanate equivalent weight ranging between 200 to 400 g/eq.

5. The one component powder coating composition according to claim 1, wherein the polycarbonate diol has a hydroxyl value of between 20 and 50 mgKOH/g.

6. The one component powder coating composition according to claim 1, wherein the polycarbonate diol has a number average molecular weight of between 1500 and 4000 g/mol.

7. The one component powder coating composition according to claim 1, wherein the isocyanate curing agent additionally comprises a blocked uretdione curing agent.

8. The one component powder coating composition according to claim 1, wherein at least 20 wt % of the isocyanate curing agent comprises an unblocked uretdione curing agent.

9. The one component powder coating according to claim 1, wherein the coating composition additionally comprises a non-isocyanate curing agent capable of reacting with carboxyl functional groups of the thermosetting resin.

10. The one component powder coating composition of claim 9 wherein the non-isocyanate curing agent comprises one β-hydroxyalkylamide curing agent.

11. The one component powder coating composition according to claim 9 or claim 10 comprising
    (a) 40 to 70 wt % of the thermosetting resin,
    (b) 15 to 40 wt % of the isocyanate curing agent, and
    (c) 0.5 to 7 wt % of the non-isocyanate curing agent
    wherein the wt % is based on the total weight of the powder coating composition.

12. A coated substrate comprising a substrate coated with a one component powder coating composition according to claim 1.

13. The coated substrate of claim 12, wherein the substrate is a metallic substrate.

* * * * *